US008359472B1

(12) United States Patent
Ren et al.

(10) Patent No.: US 8,359,472 B1
(45) Date of Patent: Jan. 22, 2013

(54) DOCUMENT FINGERPRINTING WITH ASYMMETRIC SELECTION OF ANCHOR POINTS

(75) Inventors: Liwei Ren, Sunnyvale, CA (US); Qiuer Xu, Jiangsu (CN)

(73) Assignee: Trend Micro Incorporated, Tokyo (JP)

(*) Notice: Subject to any disclaimer, the term of this patent is extended or adjusted under 35 U.S.C. 154(b) by 374 days.

(21) Appl. No.: 12/731,874

(22) Filed: Mar. 25, 2010

(51) Int. Cl.
*H04L 9/32* (2006.01)
(52) U.S. Cl. .......................................... 713/176; 726/26
(58) Field of Classification Search ........................ None
See application file for complete search history.

(56) References Cited

U.S. PATENT DOCUMENTS

| | | | |
|---|---|---|---|
| 6,493,709 B1 | 12/2002 | Aiken | |
| 6,584,470 B2 | 6/2003 | Veale | |
| 7,031,972 B2 | 4/2006 | Ren et al. | |
| 7,516,130 B2 | 4/2009 | Ren et al. | |
| 7,702,683 B1* | 4/2010 | Kirshenbaum | 707/758 |
| 2003/0172066 A1 | 9/2003 | Cooper et al. | |
| 2004/0162786 A1 | 8/2004 | Cross et al. | |
| 2006/0253439 A1 | 11/2006 | Ren et al. | |
| 2008/0195606 A1* | 8/2008 | Ren et al. | 707/5 |

OTHER PUBLICATIONS

Muhammad Sharif, et al. "Multiple Values Search Algorithm" 2007-Spring 2008, pp. 49-58, vol. 1, No. 2, Journal of Information & Communication Technology.
Chakrabarti, et al. "Scalable feature selection, classification and signature generation for organizing large text databases into hierachical taxonomies", 1998, pp. 163-178, vol. 7, No. 3, VLDB Journal.
Anagnostopoulos, A. et al., "Sampling Search-Engine Results," Proceedings of the 14th International Conference on World Wide Web, WWW 2005, May 10-14, 2005, pp. 245-256, Chiba, Japan.
Chen. J., et al., "Knowledge Discovery and Data Mining Based on Power Plant Real-Time Database: A Survey", Oct. 8-12, 2001, pp. 1-5, Proceedings of International Conference on Power Engineering, Xi'an, China.
Chen, L., et al., "Template Detection for Large Scale Search Engines," Apr. 23-27, 2006, 5 pgs., SAC '06, Dijon, France.
Hamilton. N., "The Mechanics of a Deep Net Metasearch Engine", 2003, 2 pgs., Proceedings of the 12th International World Wide Web Conference.
Jessop, M., et al., "Pattern Matching Against Distributed Datasets", 2004, 6 pgs. University of York, UK.
Lai, W.C., et al., "An Anatomy of a Large-Scale Image Search Engine", Dec. 2002, 4 pgs., IEEE MSE, Santa Barbara, CA.
Lavrenko, V., et al., "Relevance Models for Topic Detection and Tracking", 2002, 6 pgs., University of Massachusetts, MA.
Pallickara, S. et al., "Incorporating an XML Matching Engine in Distributed Brokering Systems", 2003, pp. 1-7, Proceedings of the International Conference on Parallel and Distributed Processing Techniques and Applications (PDPTA '03).

* cited by examiner

*Primary Examiner* — Cordelia Zecher
(74) *Attorney, Agent, or Firm* — Okamoto & Benedicto LLP

(57) ABSTRACT

One embodiment relates to a computer-implemented process for generating document fingerprints. A document is normalized to create a normalized text string. A first hash function with a sliding hash window is applied to the normalized text string to generate an array of hash values. Candidate anchoring points are selected by applying a first filter to the array of hash values. The anchoring points are chosen by applying a second filter to the candidate anchoring points. Finally, a second hash function is applied to substrings located at the chosen anchoring points to generate hash values for use as fingerprints for the document. Other embodiments and aspects are also disclosed.

21 Claims, 9 Drawing Sheets

FIG. 5    500

DOCUMENT FINGERPRINTING WITH ASYMMETRIC SELECTION OF ANCHOR POINTS

BACKGROUND OF THE INVENTION

1. Field of the Invention

The present invention relates generally to methods and apparatus for document or text string fingerprinting. The technology disclosed herein is applicable in various fields, including data leakage prevention, spam filtering, search engine, anti-plagiarism, data de-duplication, and so forth.

2. Description of the Background Art

One problem in the field of network security relates to data leakage prevention (DLP). DLP is needed to avoid loss of proprietary information, intellectual property, and other sensitive data. To protect sensitive data, enterprises need an effective DLP solution which monitors potential information leaks at the point of use. However, the explosion of messaging systems, wireless networking, and universal serial bus (USB) storage devices has made the protection of critical enterprise data difficult. As a result, enterprises are experiencing an increase in the loss and even theft of data assets by employees or contractors or even hackers (and malwares) who maliciously or accidentally leak data.

Another problem in the field of network security relates to unsolicited messages in e-mail systems. Such unsolicited messages, also referred to as "spam," are mass mailed by spammers to e-mail accounts over the Internet. Various anti-spam software products have been developed to combat spam.

It is highly desirable to improve technologies which facilitate document or text string fingerprinting for data leakage prevention, spam filtering, and other applications.

SUMMARY

One embodiment relates to a computer-implemented process for generating document fingerprints. A document is normalized to create a normalized text string. A first hash function with a sliding hash window is applied to the normalized text string to generate an array of hash values. Candidate anchoring points are selected by applying a first filter to the array of hash values. The anchoring points are chosen by applying a second filter to the candidate anchoring points. Finally, a second hash function is applied to substrings located at the chosen anchoring points to generate hash values for use as fingerprints for the document.

Another embodiment relates to a computer-implemented method for document leakage prevention. A first procedure is applied to sensitive documents to be protected. The first procedure uses a first filter and a second filter to choose anchoring points and generates fingerprints based on the chosen anchoring points. A second procedure is applied to a target document to be inspected for sensitive text. The second procedure uses the first filter, but not the second filter, to select anchoring points and generates target fingerprints based on the selected anchoring points.

Another embodiment relates to a computer apparatus configured to generate document fingerprints. The apparatus includes data storage configured to store computer-readable instruction code and data, and a processor configured to access the data storage and to execute said computer-readable instruction code. Computer-readable instruction code is configured to normalize a computer-readable document to create a normalized text string and apply a first hash function with a sliding hash window to the normalized text string to generate an array of hash values. Computer-readable instruction code is also configured to apply a first filter to the array of hash values to select candidate anchoring points, and apply a second filter to the candidate anchoring points to select anchoring points. Finally, computer-readable instruction code is configured to apply a second hash function to substrings located at the selected anchoring points to generate hash values for use as fingerprints of the document.

Another embodiment relates to a data leakage prevention apparatus implemented on a distributed network of computer apparatus. The data leakage prevention apparatus includes a server computer and a plurality of end-point computers. The server computer is configured to apply a first procedure to sensitive documents to be protected. The first procedure uses a first filter and a second filter to choose anchoring points and generates fingerprints based on the chosen anchoring points. The plurality of end-point computers are configured to each apply a second procedure to a target document to be inspected for sensitive text. The second procedure uses the first filter, but not the second filter, to select anchoring points and generates target fingerprints based on the selected anchoring points.

Another embodiment relates to a computer-implemented method for cleaning irrelevant fingerprints from a fingerprint database for sensitive documents. A non-sensitive document is retrieved from a pool of documents that are registered as non-sensitive. The non-sensitive document is normalized, and fingerprints are generated from the normalized document. The generated fingerprints are then removed from the fingerprint database for sensitive documents.

These and other embodiments and features of the present invention will be readily apparent to persons of ordinary skill in the art upon reading the entirety of this disclosure, which includes the accompanying drawings and claims.

DETAILED DESCRIPTION

Computer Apparatus

Figure 1:
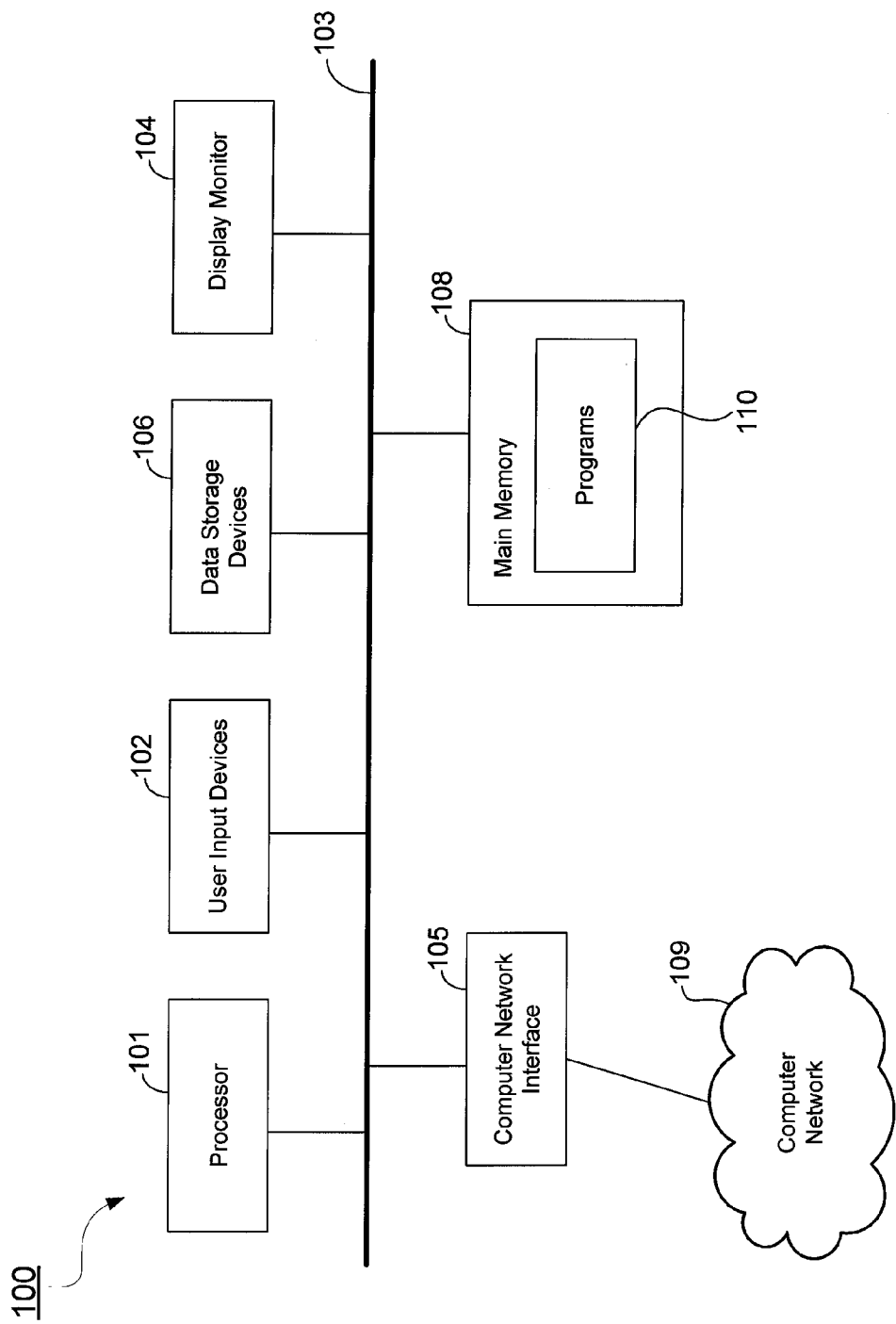
FIG. 1 is a schematic diagram of an example computer that may be used in embodiments of the present invention.

Referring to FIG. 1, there is shown a schematic diagram of an example computer apparatus that may be used in embodiments of the present invention. The computer shown in the example of FIG. 1 may be employed as a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse, etc.), a display monitor 104 (e.g., LCD, cathode ray tube, flat panel display, etc.), a computer network or communications interface 105 (e.g., network adapters, wireless network adapters, etc.) for communicating over a computer (data) network 109, one or more data storage devices 106 (e.g., hard disk drive, optical drive, FLASH memory, etc.) for storing computer-readable data onto computer-readable media and for reading the data therefrom, and a main memory 108 (e.g., DRAM, SRAM, etc.).

Computer-readable data (including computer-readable program instructions) may be stored in the data storage devices 106 and may be loaded into main memory 108. Computer-readable data may also be received over the computer network 109 by way of a communications interface 105. In particular, the main memory 108 may loaded with programs 110 (comprising computer-readable instruction code and data) which may be executed by the processor 101 to perform some of the functionalities and operations as described herein.

Matching Engine with Asymmetric Signature Generation

Figure 2:
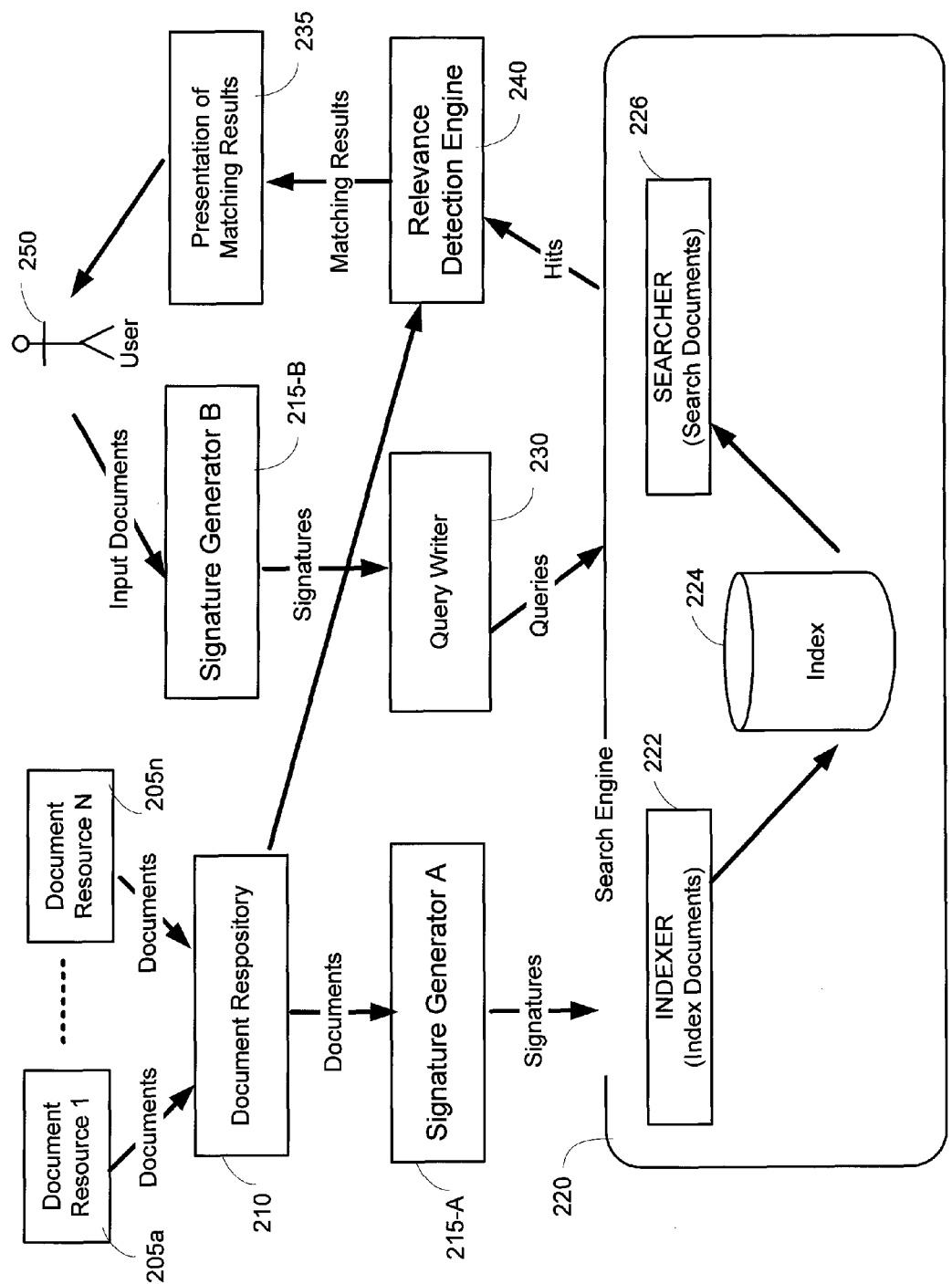
FIG. 2 depicts an embodiment of an architecture of a matching engine with asymmetric fingerprint generation in accordance with the present invention.

FIG. 2 illustrates an architecture of a matching engine with asymmetric signature generation in accordance with an embodiment of the invention. As shown in FIG. 2, one or more document resources 205 (*a-n*) may be collected (or stored) in a document repository 210. The architecture is configured to provide uniqueness of the generated "fingerprints" (also called signatures herein) in relation to a unique input document. The architecture is further configured to limit the number of fingerprints collected while keeping the stability of the collection across varied versions of the same document. It is noted that in one embodiment, each fingerprint is a value, for example, a hash representation corresponding to particular information or a string of ASCII characters in the document.

Referring now to an embodiment of a process with respect to the architecture, initially it is noted that documents 205 may be collected manually or through use of a crawler. For example, a crawler may be configured to visit all assigned document sources to collect documents, assigns a unique document identifier (ID) to each document that is collected, and then place the unique document ID and document into the document repository 210.

A first fingerprint generator (Signature Generator A) 215-A generates a list of "fingerprints" from particular documents in the document repository 210. The fingerprints (also called signatures) are strings or values that one makes from the unique information that represents a document. This representative information is unique to the document and stable when the document has moderate changes. In accordance with one embodiment, the fingerprint generation process is applied to documents after they have been processed with UTF-8 (universal transformation format) encoding for any language supported by Unicode.

Once the first fingerprint generator 215-A generates signatures for the particular document, an indexer 222 may index the document with a unique document identifier (ID) and the signatures generated by the fingerprint generator 215-A. The result is an indexed document (by indexer 222) that is stored in an index database 224 of a search engine 220.

With the indexed document in the index database 224 of the search engine 220, the document is ready to be queried against. A user 250 may use a query writer 230 to compose a query expression. It is noted that a query input identifies or provides the input document for the query. The user 250 does not need to know what the signatures are; rather, the user 250 only needs to know what the input document is. The input document is passed to a second signature generator 215-B. The signatures output from the second fingerprint generator 215-B are passed to the query writer 230 for query composition. The composed query is then passed to a searcher 226 (search mechanism) for searching documents.

The searcher 226 in the search engine 220 searches the index database 224 using the query provided through the query writer 230. The searcher may return a list of possible relevant documents 226 ("hits") to a relevance detection engine 240. The relevance detection engine 240 may calculate a relevance (e.g., in percentage terms) between the input document and the hits.

Figure 3:
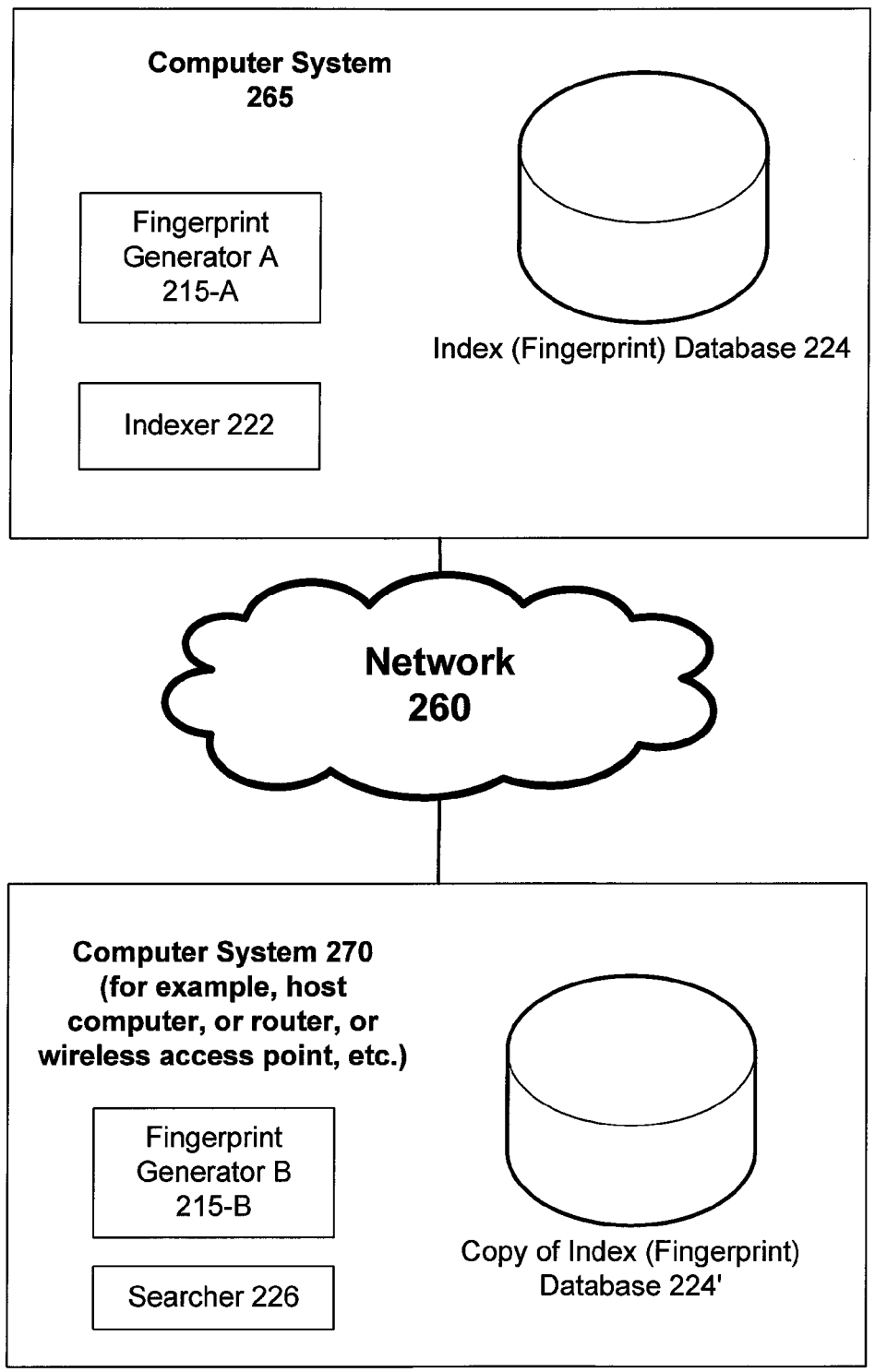
FIG. 3 illustrates deployment of the matching engine with document fingerprint generation in a distributed computing environment.

The matching engine architecture described above may be preferably implemented within the context of a distributed computing environment. In other words, consider the case where the indexer 222 and the searcher 226 are deployed at different computer systems across a network 260. This case is depicted in FIG. 3. In this case, the index (signature or "fingerprint") database 224 is generated at the computer system 265 of the indexer 222. However, the searcher 226 also needs access to a copy of the index database 224', preferably an up-to-date or relatively up-to-date copy, in order to execute the document search queries. Therefore, a copy of the index database 224' needs to be downloaded to the computer system 270 of the searcher 226.

For example, in the context of a large corporate enterprise, the number of documents in the document depository may grow to be a very large number, for example, in excess of a million documents or more. As the number of documents indexed becomes larger and larger, the index database 224 becomes larger and larger. As such, the network bandwidth cost of downloading a copy of the large index database 224' may become prohibitive. In addition, the data storage space required at the computer system 270 of the searcher 226 to store the copy of the large index database 224' may also become problematic.

Such bandwidth and storage constraints may be overcome using an embodiment of the present invention. In particular, note that the matching engine architecture of FIG. 2 is asymmetric in that the fingerprint generator 215-A for the indexer 222 and the fingerprint generator 215-B for the searcher 226 are different. The present disclosure provides a scalable solution utilizing this asymmetry.

Higher Detection Rate Solution

Furthermore, the new solution disclosed in the present patent application has a surprising and unexpected result in that it has a much higher detection rate when detecting document variants. In testing their implementation of this solution, applicants have found that the presently disclosed solution was capable of detecting the relevance of a variant of a fingerprinted document, even when there was a 50% (or more) content difference between the two documents. This result far exceeds the capabilities of previous solutions. Being able to detect variants with a much greater detection rate is a substantial advantage in DLP and in spam filtering systems.

Overview of the Newly-Posed Problem and the Presently-Disclosed Solution

The technology disclosed herein provides a practical solution to the following newly-posed problem. Assume one has multiple well-classified document sets $\{S_1, S_2, \ldots, S_m\}$, where $S_i$ represents a set of documents. Given any document D, identify a document d from $S_1, S_2, \ldots, S_m$ such that D contains some parts of d.

An overview of the presently-disclosed solution to the above-described newly-posed problem is as follows. The solution includes the use of a dual-level filtering technique to select a very small set of hash values as document fingerprints at the server side, and a single-level filtering technique to select a somewhat larger set of hash values as document fingerprints at the agent side. In addition, the fingerprints may be categorized as "red" (irrelevant) and "green" (relevant) fingerprints, and the red fingerprints may be removed from the index database to substantially reduce false-positive detections.

Note that the above-described newly-posed problem is different in a significant way from the previously-posed problem whose solution is disclosed in U.S. patent application Ser. No. 12/069,659, entitled "Document Matching Engine Using Asymmetric Signature Generation," filed Feb. 11, 2008 by Liwei Ren, et al., which is now published as U.S. Patent Application Publication Number 2008/0195606, dated Aug. 14, 2008. The previously-posed problem is as follows. Assume one has multiple well-classified document sets $\{S_1, S_2, \ldots, S_m\}$, where $S_i$ represents a set of documents. Given any document D, identify a document d from $S_1, S_2$, such that D is similar to d.

Example Use Cases

The document (or text string) fingerprinting technique disclosed herein has a higher detection rate than previous techniques. A data leakage prevention product using this technique is enabled to handle the following use cases which were not handled by prior DLP products.

Use case 1: Partial text of a fingerprinted document may be copied into a very large document. A DLP product using the presently-disclosed technique is capable of detecting the presence of the partial text in the very large document.

Use case 2: A fingerprinted document may be modified with 50% or more of its text changing. A DLP product using the presently-disclosed technique is capable of detecting the modified document as a variant of the fingerprinted document.

The document (or text string) fingerprinting technique disclosed herein has a lower false-positive detection rate than previous techniques. A data leakage prevention product using this technique is enabled to handle the following use cases which were not handled by prior DLP products.

Use case 3: There may be some non-sensitive documents in a document repository that do not need to be protected. A DLP product using the presently-disclosed technique is capable of avoiding false-positive detections of these non-sensitive documents.

Use case 4: There may be some non-sensitive paragraphs that are contained in sensitive documents. If the sensitive documents are fingerprinted, other non-sensitive documents containing these paragraphs may lead to false positives. A DLP product using the presently-disclosed technique is capable of avoiding false-positive detections of other documents with these non-sensitive paragraphs.

Details of the New Technique

First, let us reiterate the newly-posed problem which is solved by the new technique disclosed herein. Assume one has multiple well-classified document sets $\{S_1, S_2, \ldots, S_m\}$, where $S_i$ represents a set of documents. Given any document D, identify a document d from $S_i, S_2, S_m$ such that D contains some parts of d.

The following is a detailed explanation of the new technique which solves the above-described newly-posed problem. The solution includes the use of a dual-level filtering technique to select a very small set of hash values as document fingerprints at the server side, and a single-level filtering technique to select a somewhat larger set of hash values as document fingerprints at the agent side.

Before we go further in the explanation, let us discuss the following terms.

(a) Document normalization—This is a process that may include the following three sub-processes in accordance with an embodiment of the invention.
   i) Converting a document in any format, such as Word, Excel, PPT, PDF and so forth, into a plain text encoded in UTF-8.
   ii) Translating any plain text in other encodings into the plain text encoded in UTF-8.
   iii) Removing the non-informative characters such as white spaces, control characters, delimiters and so forth.

(b) Normalized document—The textual string encoded in UTF-8 after the document is normalized. In the preceding context, a document referred to herein is generally normalized unless indicated otherwise. A normalized document can be viewed as either a UTF-8 string or a binary string. In this disclosure, we generally view a normalized document as a binary string.

(c) Document fingerprint—Document fingerprints are document attributes used to characterize some invariants of a document. They should have the following characteristics.
   i) Unrelated and irrelevant documents should not share any fingerprint.
   ii) A variant of a document is expected to have some common fingerprints with its original version.

(d) Anchoring points—Anchoring points are offsets in a normalized document. The anchoring points are expected to satisfy the following properties.
   i) Robustness—When the original document changes, the anchoring points should remain in the document variants with high probability.
   ii) Uniqueness—The neighborhood around the anchoring point as a string should be unique in the sense that other irrelevant documents should not share the same string.

Figure 4:
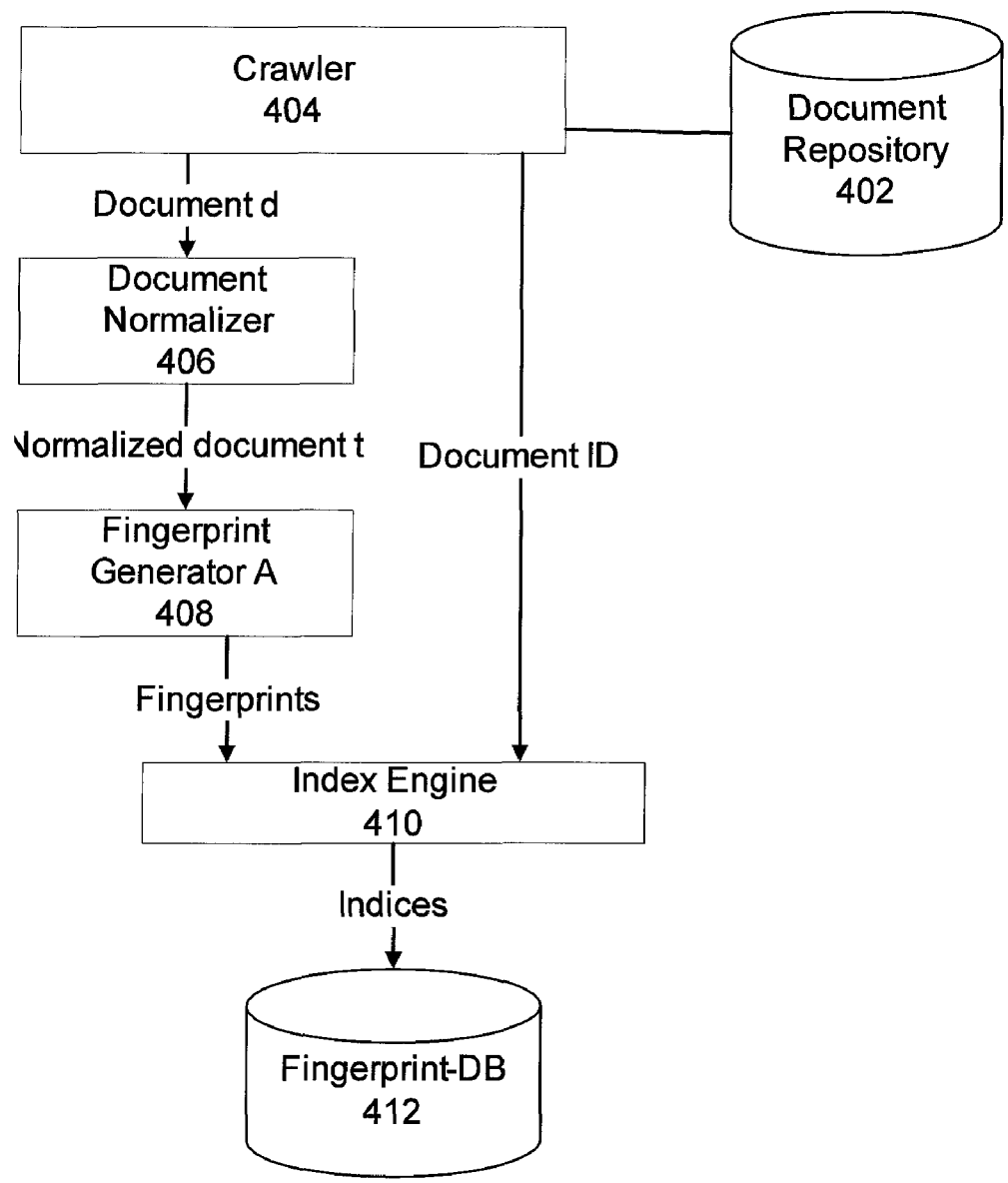
FIG. 4 depicts a process for document indexing in accordance with an embodiment of the invention.

FIG. 4 depicts a process 400 for document indexing in accordance with an embodiment of the invention. This process 400 may be performed at a computer server (for example, at computer system 265 in FIG. 3).

As shown, a set of documents is stored in a well-defined document repository 402. A computer-implemented crawler 404 fetches a document d from the repository 402 and assigns it a unique document ID. The document d is processed by a document normalizer 406 which outputs a normalized document t.

The normalized document t is then processed by fingerprint generator A 408 to generate multiple fingerprints from t. An exemplary procedure performed by fingerprint generator A is described further below in relation to FIGS. 6 through 8.

The fingerprints generated and corresponding document ID are provided to an index engine 410. The index engine 410 is configured to index the fingerprints generated and corresponding document ID into well-structured files referred to as the Fingerprint-DB (fingerprint database) 412. This process 400 may repeated for a large number of documents d in the document repository so as to index their fingerprints into the Fingerprint-DB 412.

Figure 5:
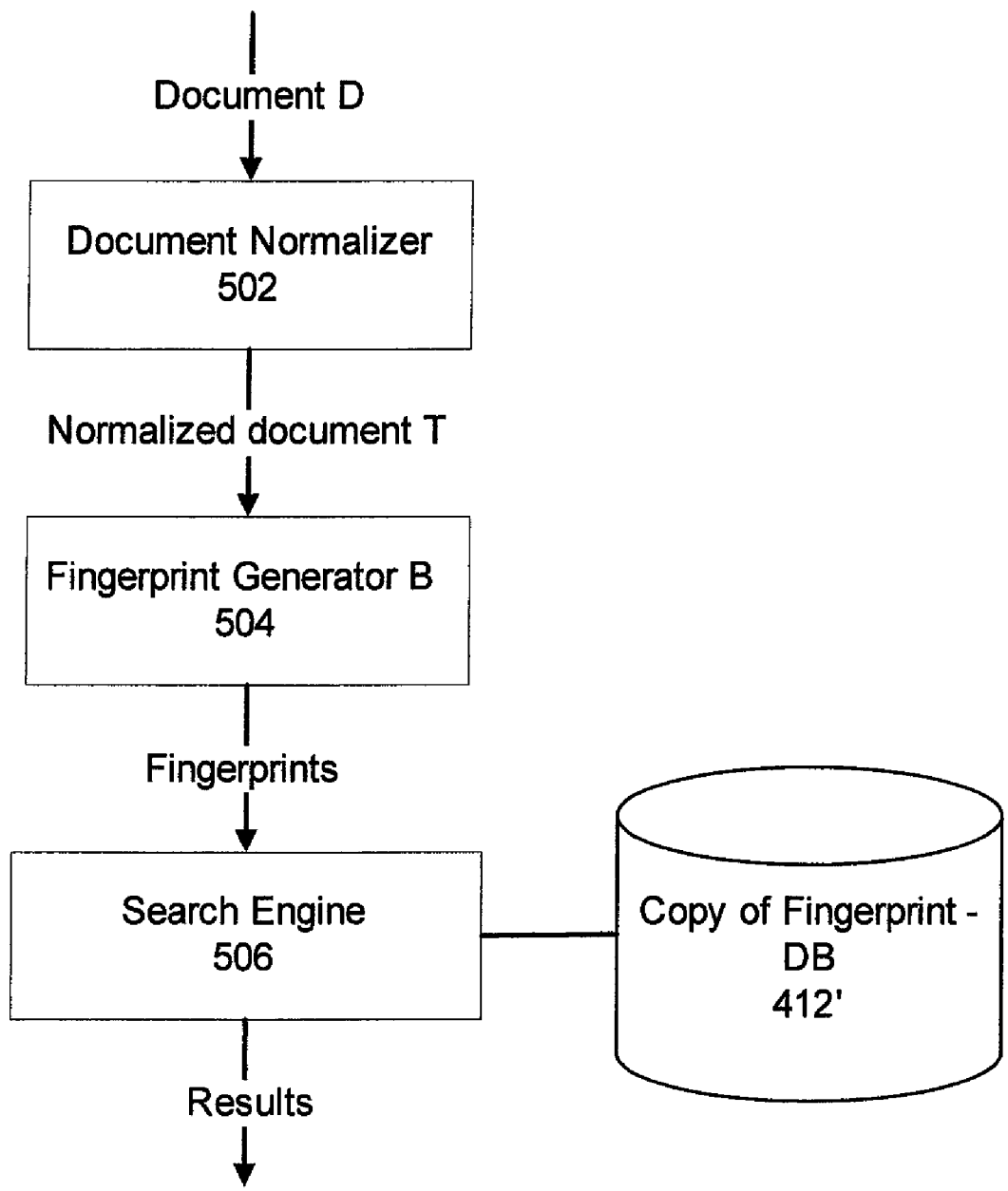
FIG. 5 depicts a process for document variant detection in accordance with an embodiment of the invention.

FIG. 5 depicts a process 500 for document variant detection in accordance with an embodiment of the invention. This process 500 may be performed at a computer-implemented agent in a distributed system (for example, at client computer 270 in FIG. 3).

As shown, a document D to be inspected may be received by a document normalizer 502 and processed to provide a normalized document T. The normalized document T is then processed by fingerprint generator B 504 to generate multiple fingerprints from T. An exemplary procedure performed by fingerprint generator B is described further below in relation to FIG. 6.

The fingerprints generated are provided to a search engine 506. The search engine 506 is configured to search the Fingerprint-DB (fingerprint database) 412'. The Fingerprint-DB 412' may be a fingerprint database which was generated by an index engine at a server computer and sent to a client computer for use by the search engine. The search results may indicate any document ID which is associated with at least one query fingerprint. The search results may also indicate how many query fingerprints were found to be relevant to each aforementioned document ID.

Of particular relevance to the present disclosure are the innovative fingerprinting processes used by fingerprint generators A and B. As disclosed herein, a surprisingly important part of the fingerprinting processes involves locating anchoring points in the text and generating fingerprints based hash values corresponding to the anchoring points. As such, the technique for locating the anchoring points serves to differentiate this fingerprinting technology from prior technologies.

While a previously-disclosed technique uses a combination of scoring and sorting, the presently-disclosed technique locates the anchoring points using a combination of a rolling hash and filters. The presently-disclosed technique results in anchoring points which are better distributed across the normalized text. The improved distribution of the anchoring points enables the improved detection rate of this newly-disclosed technology.

Fingerprinting at the Back-End (Generating the Index)

As mentioned above, in order to generate the fingerprint-DB 412, fingerprint generator A 408 may utilize a dual-filtering technique. An exemplary embodiment of this technique is described as follows and is illustrated in relation to FIGS. 6 through 8.

Figure 6:
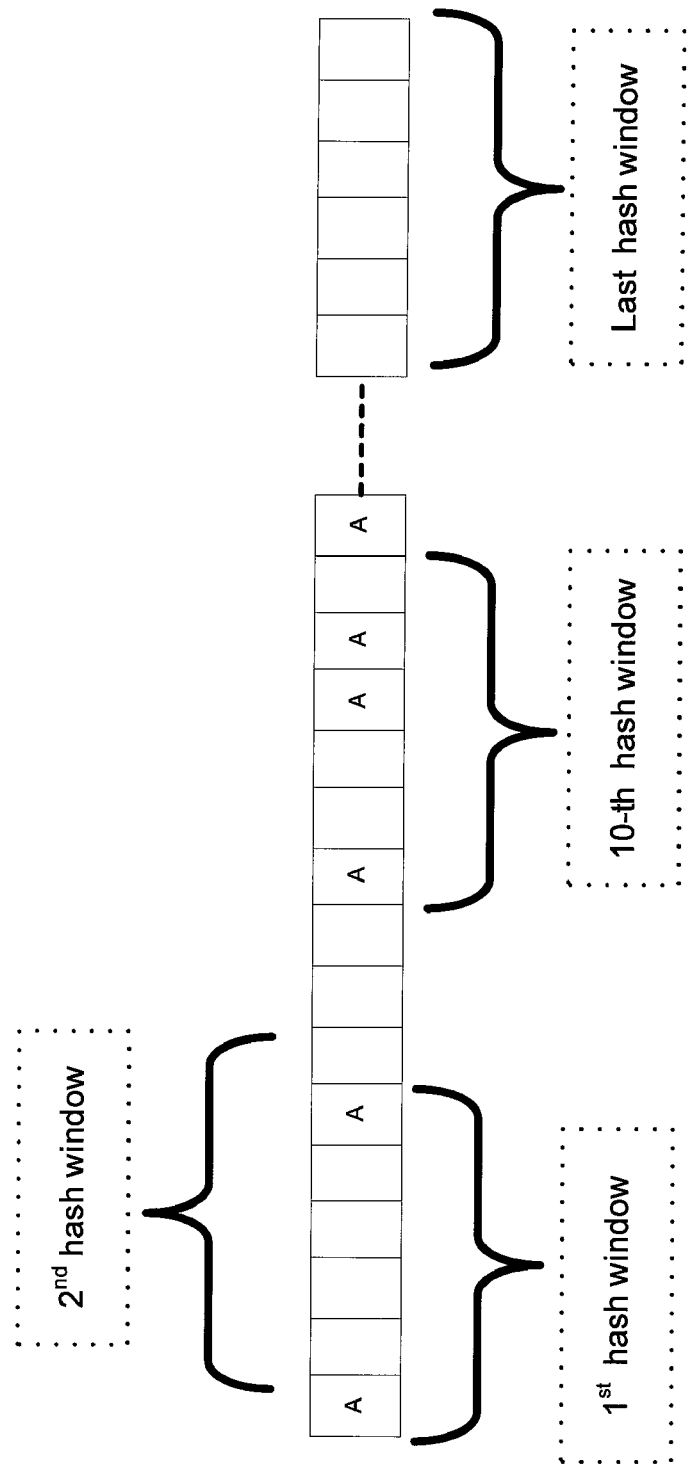
FIG. 6 illustrates a sliding hash window and anchoring points from a first filter in accordance with an embodiment of the invention.

In FIG. 6, each block in the depicted array represents a character of the normalized text string. First, a rolling hash function H1 with pre-defined hash window size may be used to slide thorough and process the normalized text string. The sliding hash window is shown in FIG. 6. The rolling hash function H1 generates one hash value h from each sliding hash window. In accordance with one implementation, the rolling hash function may comprise a Karp-Rabin function.

In accordance with an embodiment of the invention, a first filter (Filter 1) is applied to these hash values. The first filter selects those hash values h which satisfy h=0 mod p, where p is a pre-defined prime number. The hash values selected by the first filter are candidate anchoring points and are shown in FIG. 6 by the letter A in the array.

Figure 7:
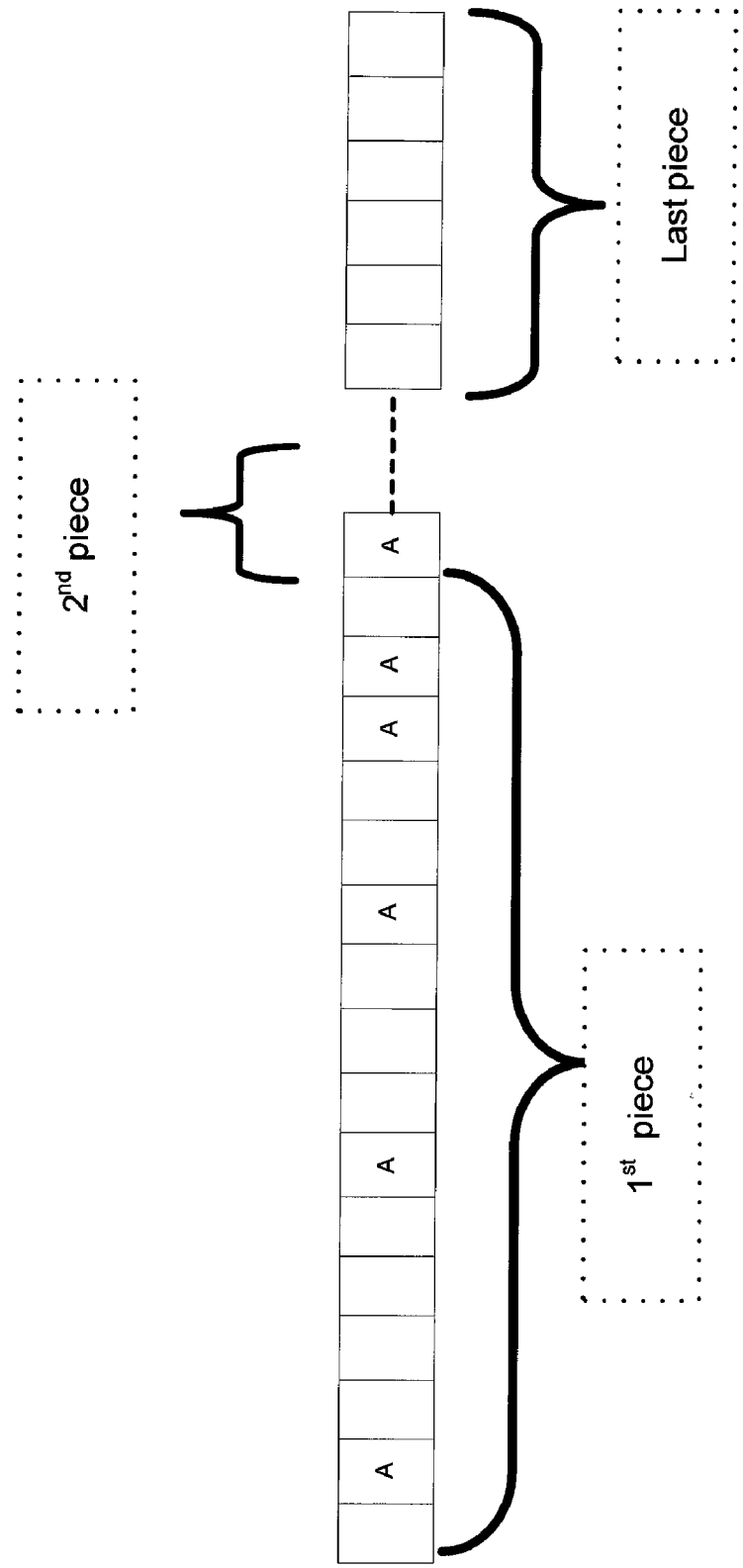
FIG. 7 depicts the division of a normalized textual string into a number of pieces in accordance with an embodiment of the invention.

In accordance with an embodiment of the invention, a second filter (Filter 2) is applied to these candidate anchoring points. Applying the second filter involves dividing the normalized text string in binary form into a plurality of N pieces, and selecting one candidate anchoring point per piece. In an exemplary embodiment, the N pieces are of equal binary size, except that last piece (whose size depends on the remaining length of the string for that last piece). FIG. 7 depicts the division of a normalized textual string into a number of pieces in accordance with an embodiment of the invention.

Figure 8:
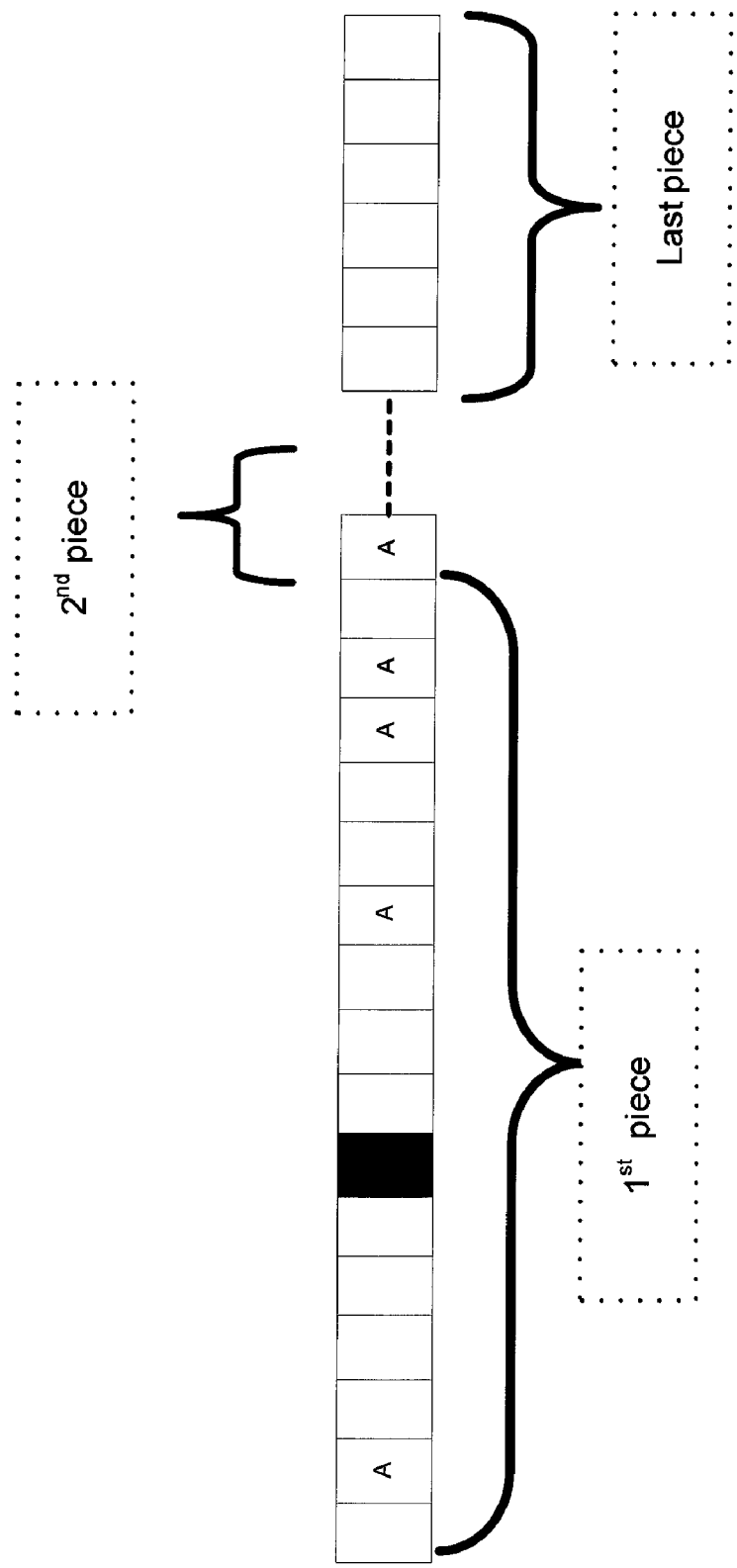
FIG. 8 shows the selection of a single anchoring point from a first piece in accordance with an embodiment of the invention.

For any piece, if it contains multiple candidate anchoring points (previously selected by Filter 1), then the candidate anchoring point closest to the centre of the piece is chosen to be the anchoring point for that piece. FIG. 8 shows the selection of a single anchoring point (the rectangle filled in black) from a first piece in accordance with an embodiment of the invention.

For each selected anchoring point, a second hash function H2 is used to create a hash value from the substring starting at that anchoring point. The size of the substring is the same as the sliding hash window. The second hash function H2 is preferably a different string hash function from the first hash function H1. Using two different hash functions advantageously reduces false positive caused by hash collisions.

The below Table 1 provides pseudo-code for one implementation of the procedure for fingerprinting at the back-end in accordance with an embodiment of the invention.

Input: T, L, q, w, p, where T is the normalized text, L is its length, q is the textual piece size, w is the hash window size, and p is a pre-determined prime number.

The parameters q, w and p should be configurable according to different uses of the technology. It is recommended that w be much smaller than q, and the p be the minimal prime number that is larger than q/8. One example of numbers for q, w and p are as follows: q=1024; w=64; and p=129.

Output: A set of fingerprints as S.

Procedure:

TABLE 1

| | |
|---|---|
| 1. | Let S1 = { } |
| 2. | Let s = 1 |
| 3. | If s > L − w + 1, go to step 7 |
| 4. | Calculate hash value h = H1(T[s, s + w − 1] ) |
| 5. | If h = 0 mod p, add s into S1 as a candidate anchoring point |
| 6. | Let s = s + 1 and go to step 3 |
| 7. | Let S2 = { } |
| 8. | Split T into N binary pieces with equal size except the last piece. Actually N = 1 + (L − 1)/q |
| 9. | Let k = 1 |
| 10. | If k > N, go to step 13 |
| 11. | From S1, identify all candidate anchoring points that fall in the k-th piece. If there are more than one candidate anchoring points in this piece, select the one which is closest to the middle of the piece. Add the selected one into S2. |
| 12. | Let k = k + 1, go to step 10 |
| 13. | Let S = { } |
| 14. | For each anchoring point s in S2, generate a hash value h = H2(T[s, s + w − 1]) and add h into S. |

As seen in Table 1, the procedure for fingerprinting at the backend includes three parts. The first part involves steps 1 through 6 and uses a rolling hash function H1 and Filter 1 to identify a set of candidate anchoring points. The second part involves steps 7 through 12 and uses Filter 2 to select a subset of the candidate anchoring points. The purpose of this is to reduce the number of fingerprints. The third part involves steps 13 and 14 and generates the fingerprints using the second hash function H2.

Fingerprinting at the Front-End (Matching Against the Index)

As mentioned above, for document variant detection at an agent computer, fingerprint generator B 504 may utilize a single-filtering technique. An exemplary embodiment of this technique is described as follows and is illustrated in relation to FIG. 6.

In FIG. 6, each block in the depicted array represents a character of the normalized text string. First, the rolling hash function H1 with pre-defined hash window size is used to slide thorough and process the normalized text string. The sliding hash window is shown in FIG. 6. The rolling hash function H1 generates one hash value h from each sliding hash window. In accordance with one implementation, the rolling hash function may comprise a Karp-Rabin function.

In accordance with an embodiment of the invention, a first filter (Filter 1) is applied to these hash values. The first filter selects those hash values h which satisfy h=0 mod p, where p is a pre-defined prime number. The hash values selected by the first filter are candidate anchoring points and are shown in FIG. 6 by the letter A in the array.

In accordance with an embodiment of the invention, no second filter is applied at the front-end. Rather, all candidate anchor points are selected or kept as anchoring points.

For each anchoring point, the second hash function H2 is used to create a hash value from the substring starting at that anchoring point. The size of the substring is the same as the sliding hash window. The second hash function H2 is preferably a different hash function from the first hash function H1. Again, using two different hash functions advantageously reduces false positive caused by hash collisions.

The below Table 2 provides pseudo-code for one implementation of the procedure for fingerprinting at the front-end in accordance with an embodiment of the invention.

Input: T, L, w, p, where T is the normalized text, L is its length, w is the hash window size, and p is the pre-determined prime number. The two parameters w and p are defined as they were in the pseudo-code for the front-end.

Output: A set of fingerprints as S.

Procedure:

TABLE 2

| | |
|---|---|
| 1. | Let S1 = { } |
| 2. | Let s = 1 |
| 3. | If s > L − w + 1, go to step 7 |
| 4. | Calculate hash value h = H1(T[s, s + w − 1]) |
| 5. | If h = 0 mod p, add s into S1 as a candidate anchoring points |
| 6. | Let s = s + 1 and go to step 3 |
| 7. | Let S2 = S1 |
| 8. | Let S = { } |
| 9. | For each anchoring point s in S2, generate a hash value h = H2( T[s, s + w − 1]) and add h into S. |

As seen in Table 2, the procedure for fingerprinting at the front-end differs from the procedure at the back-end in that it does not apply the second filter to reduce the number of anchoring points.

"Red" and "Green" Fingerprints

Figure 9:
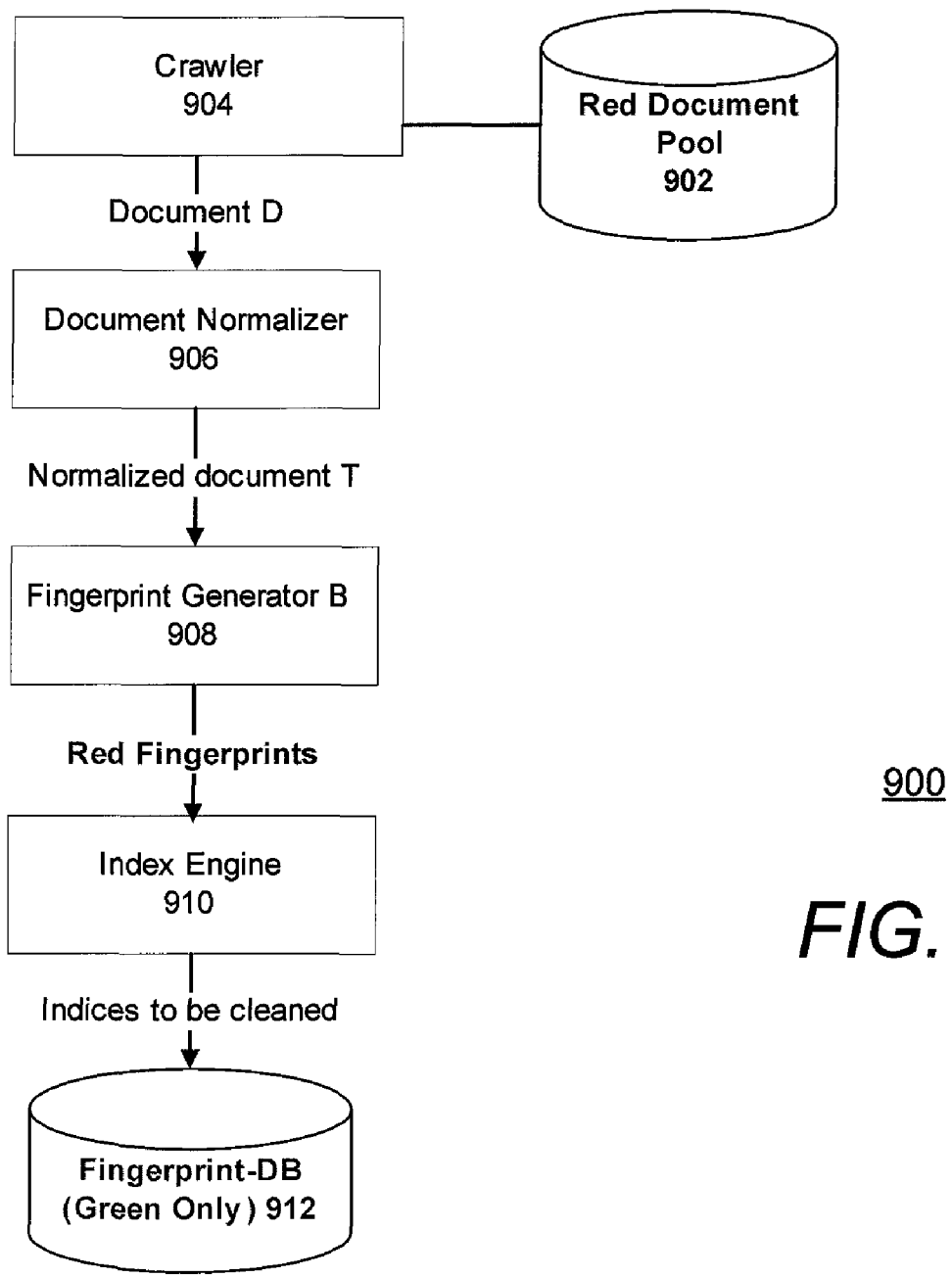
FIG. 9 depicts a process to clean "red" fingerprints from a fingerprint database in accordance with an embodiment of the invention.

FIG. 9 depicts a process to remove "red" fingerprints from a fingerprint database in accordance with an embodiment of the invention. In this section, we introduce the distinction between "red" (irrelevant) and "green" (relevant) fingerprints. Green fingerprints are generated from sensitive text, while red fingerprints are generated from non-sensitive text. The red/green fingerprint distinction is utilized to provide solutions for above Use cases 3 and 4.

In accordance with an embodiment of the invention, non-sensitive documents (and non-sensitive paragraphs within sensitive documents) may be registered into a non-sensitive pool 902. This pool may be referred to as the red document pool.

A crawler 904 may retrieve various documents, such as document D, from the non-sensitive pool 902. A document normalizer 906 may normalize the document to provide normalized document T.

Fingerprints may be generated from T using Fingerprint Generator B 908. These fingerprints are referred to as red fingerprints.

The red fingerprints may be provide to the index engine 910. The index engine 910 may apply a process to remove or clean the red fingerprints from the Fingerprint-DB 912. This results in the Fingerprint-DB 912 including only green fingerprints (those not categorized as red). Advantageously, this avoids many false-negative detections which relate only to non-sensitive text per Use cases 3 and 4.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. A computer-implemented process for generating document fingerprints, the method being performed using a computer including at least a processor, data storage, and computer-readable instructions, and the method comprising:
    normalizing a document to create a normalized text string;
    applying a first hash function with a sliding hash window to the normalized text string to generate an array of hash values;
    applying a first filter to the array of hash values to select candidate anchoring points;
    applying a second filter to the candidate anchoring points to select anchoring points; and
    applying a second hash function to substrings located at the selected anchoring points to generate hash values for use as fingerprints of the document.

2. The process of claim 1, wherein the first hash function and the second hash functions are different functions.

3. The process of claim 1, wherein the first hash function comprises a Karp-Rabin function.

4. The process of claim 3, wherein the second hash function comprises a string hash function which is different from a Karp-Rabin function.

5. The process of claim 1, wherein the first filter selects those hash values h which satisfy h=0 mod p, where p is a prime number.

6. The process of claim 1, wherein the second filter divides the normalized text into a plurality of pieces and selects one anchoring point per piece.

7. The process of claim 6, wherein the pieces are of equal size, except for a last piece.

8. The process of claim 6, wherein if there are multiple candidate anchoring points in a single piece, then the candidate anchoring point closest to the centre of that piece is chosen to be the anchoring point for that piece.

9. The process of claim 1, wherein the fingerprints generated for a repository of sensitive documents along with corresponding document identifiers are indexed to create a fingerprint database.

10. A computer-implemented method for document leakage prevention, the method comprising:
applying a first procedure to sensitive documents to be protected, the first procedure using a first filter and a second filter to choose anchoring points and generating fingerprints based on the chosen anchoring points; and
applying a second procedure to a target document to be inspected for sensitive text, the second procedure using the first filter, but not the second filter, to select anchoring points and generating target fingerprints based on the selected anchoring points.

11. The method of claim 10, wherein the first procedure is applied at a server and is used to generate a fingerprint database.

12. The method of claim 11, wherein the second procedure is applied at a client computer and is used to detect sensitive text within the target document by matching the target fingerprints against the fingerprint database.

13. A computer apparatus configured to generate document fingerprints, the apparatus comprising:
data storage configured to store computer-readable instruction code and data;
a processor configured to access the data storage and to execute said computer-readable instruction code;
computer-readable instruction code configured to normalize a computer-readable document to create a normalized text string;
computer-readable instruction code configured to apply a first hash function with a sliding hash window to the normalized test string to generate an array of hash values;
computer-readable instruction code configured to apply a first filter to the array of hash values to select candidate anchoring points;
computer-readable instruction code configured to apply a second filter to the candidate anchoring points to select anchoring points; and
computer-readable instruction code configured to apply a second hash function to substrings located at the selected anchoring points to generate hash values for use as fingerprints of the document.

14. The computer apparatus of claim 13, wherein the first hash function comprises a Karp-Rabin function.

15. The computer apparatus of claim 14, wherein the second hash function comprises a string hash function which is different from a Karp-Rabin function.

16. The computer apparatus of claim 13, wherein the first filter selects those hash values h which satisfy h=0 mod p, where p is a prime number.

17. The computer apparatus of claim 13, wherein the second filter divides the text into a plurality of pieces and selects one anchoring point per piece.

18. The computer apparatus of claim 17, wherein if there are multiple candidate anchoring points in a single piece, then the candidate anchoring point closest to the centre of that piece is chosen to be the anchoring point for that piece.

19. The computer apparatus of claim 13, wherein the fingerprints generated for a repository of sensitive documents along with corresponding document identifiers are indexed to create a fingerprint database.

20. A data leakage prevention apparatus implemented on a distributed network of computer apparatus, the data leakage prevention apparatus comprising:
a server computer configured to apply a first procedure to sensitive documents to be protected, the first procedure using a first filter and a second filter to choose anchoring points and generating fingerprints based on the chosen anchoring points; and
a plurality of end-point computers configured to each apply a second procedure to a target document to be inspected for sensitive text, the second procedure using the first filter, but not the second filter, to select anchoring points and generating target fingerprints based on the selected anchoring points.

21. The data leakage prevention apparatus of claim 20, wherein the first procedure is used to generate a fingerprint database, and wherein the second procedure is used to detect sensitive text within the target document by matching the target fingerprints against the fingerprint database.

* * * * *